United States Patent [19]

Hardin

[11] Patent Number: 5,712,860
[45] Date of Patent: Jan. 27, 1998

[54] METHODS AND SYSTEM FOR USING MULTI-BLOCK BURSTS IN HALF DUPLEX SUBSCRIBER UNIT TRANSMISSIONS

[75] Inventor: Tom Hardin, Encinitas, Calif.

[73] Assignee: Cirrus Logic, Inc., Fremont, Calif.

[21] Appl. No.: 535,308

[22] Filed: Sep. 27, 1995

Related U.S. Application Data

[60] Provisional application No. 60/004,801, Sep. 22, 1995.
[51] Int. Cl.$^6$ .................................................... H04L 1/16
[52] U.S. Cl. ........................................ 371/32; 455/54.1
[58] Field of Search ................................. 371/5.5, 32, 33, 371/35, 41; 455/53.1, 54.1, 69, 73, 83, 89

[56] References Cited

U.S. PATENT DOCUMENTS

| | | | |
|---|---|---|---|
| 4,905,234 | 2/1990 | Childress et al. | 370/94.1 |
| 4,939,731 | 7/1990 | Reed et al. | 371/32 |
| 5,546,411 | 8/1996 | Leitch et al. | 371/5.5 |
| 5,566,206 | 10/1996 | Butler et al. | 375/225 |

OTHER PUBLICATIONS

Brodd, W. et al., "Operational Characteristics: BSC versus SDLC", *Data Communications* Oct., 1983, 227–233.
Madsen, J., "A Lower Cost on High Performance", *Satellite Communications* 1990, 14(2), 27.
Munro, J., "How Xmodem Works", *PC Magazine* 1990, 9(7), 294–295.

*Primary Examiner*—Stephen M. Baker
*Attorney, Agent, or Firm*—Michele K. Herman; Merle W. Richman, III; J. P. Violette

[57] ABSTRACT

The invention provides a method and system for extending channel access in a wireless communications system employing half duplex subscriber units. The subscriber units transmit multi-block bursts to improve the burst throughput over half duplex subscriber units that transmit only single-block bursts. The number of blocks per burst is selected based on the code rate used and may be selected in a manner that also maximizes the system throughput. The subscriber unit includes a block processor for assembling the blocks of data with overhead based on the code rate, a burst formatter for combining the blocks and formatting the combination based on the code rate, and a process manager for selecting the number of blocks to be transmitted in each transmit burst.

19 Claims, 7 Drawing Sheets

| XMT WINDOW | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| REV | D | D | b1 | b1 | b1 | b1 | b1 | b1 | b1 | b2 | b2 | b2 | b2 | b2 | b2 | b2 | b3 | b3 | b3 | b3 | b3 | b3 | b3 | | | | | | | | | |
| FWD | X | X | X | X | X | X | X | X | X | X | X | d1 | d1 | d1 | d1 | d1 | d1 | d1 | d2 | d2 | d2 | d2 | d2 | d2 | d2 | d3 | d3 | d3 | d3 | d3 | d3 | d3 |

METHODS AND SYSTEM FOR USING MULTI-BLOCK BURSTS IN HALF DUPLEX SUBSCRIBER UNIT TRANSMISSIONS

This application claims the benefit of U.S. Provisional Application Ser. No. 60/004,801, filed Sep. 22, 1995.

FIELD OF THE INVENTION

The present invention relates to the field of wireless communications systems, and more particularly, to methods and a system for extending channel access for half-duplex subscriber units in mobile land-based communications systems.

BACKGROUND OF THE INVENTION

Figure 1:
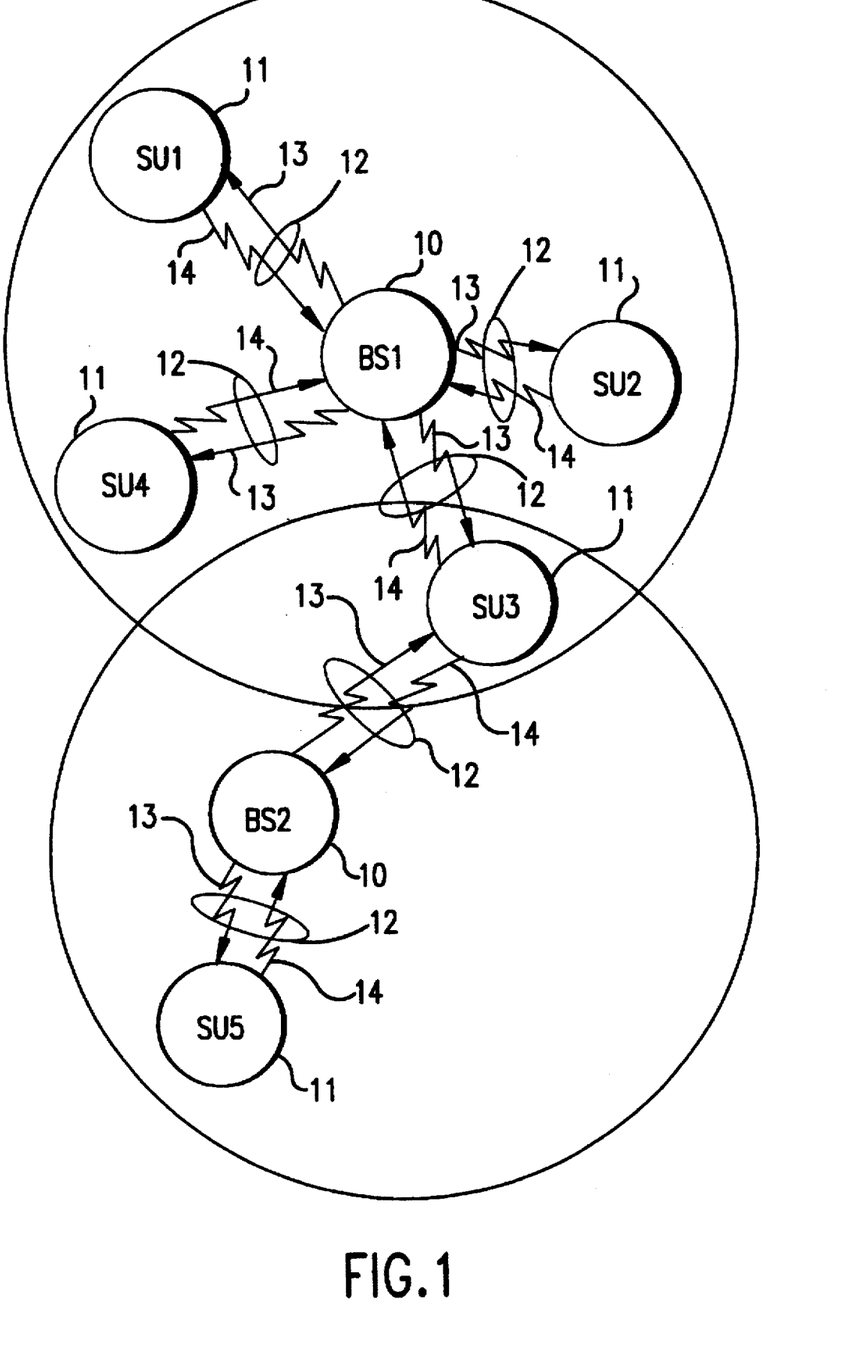
FIG. 1 shows an arrangement of base stations and subscriber units in a wireless mobile communications system.

Wireless communications systems may include, for example, cellular telephone systems such as the Advanced Mobile Phone System (AMPS), cellular modems such as the Cellular Digital Packet Data (CDPD) system, and 2-way paging systems. Such systems are primarily used for transferring data, voice, and control information between two units. These units which are shown in FIG. 1 are referred to as the base stations 10 and subscriber units (SUs) 11. Each base station is generally a stationary unit while each SU is usually portable, hand held, mounted in a vehicle, etc.

Communications between the units take place over paired RF channels 12 where transmissions between a base station and an SU are in bursts. An entire message may comprise several blocks of data and may necessarily require several bursts to transmit the entire message. Transmissions from the base station to any of the SUs are sent over the forward RF channel 13 and transmissions from any of the SUs to the base station are sent over the reverse RF channel 14.

Since the base station may communicate with a number of SUs that transmit and receive over the same pair of RF channels and, may additionally, communicate with SUs over various different pairs of RF channels, there are usually more SUs as shown in FIG. 1 than base stations. Therefore, minimizing cost, weight, and power consumption, is a more important consideration in the design of the SU than in the base station.

One way of accomplishing these design objectives is to use half-duplex SUs that can transmit and receive, but cannot do so simultaneously. In contrast to full-duplex SUs which are capable of simultaneous transmission and reception, half-duplex SUs provide a simpler design, fewer and less expensive components, and require less power. However, the use of half-duplex SUs also reduces the efficient use of both the forward and reverse channels.

Figure 2:
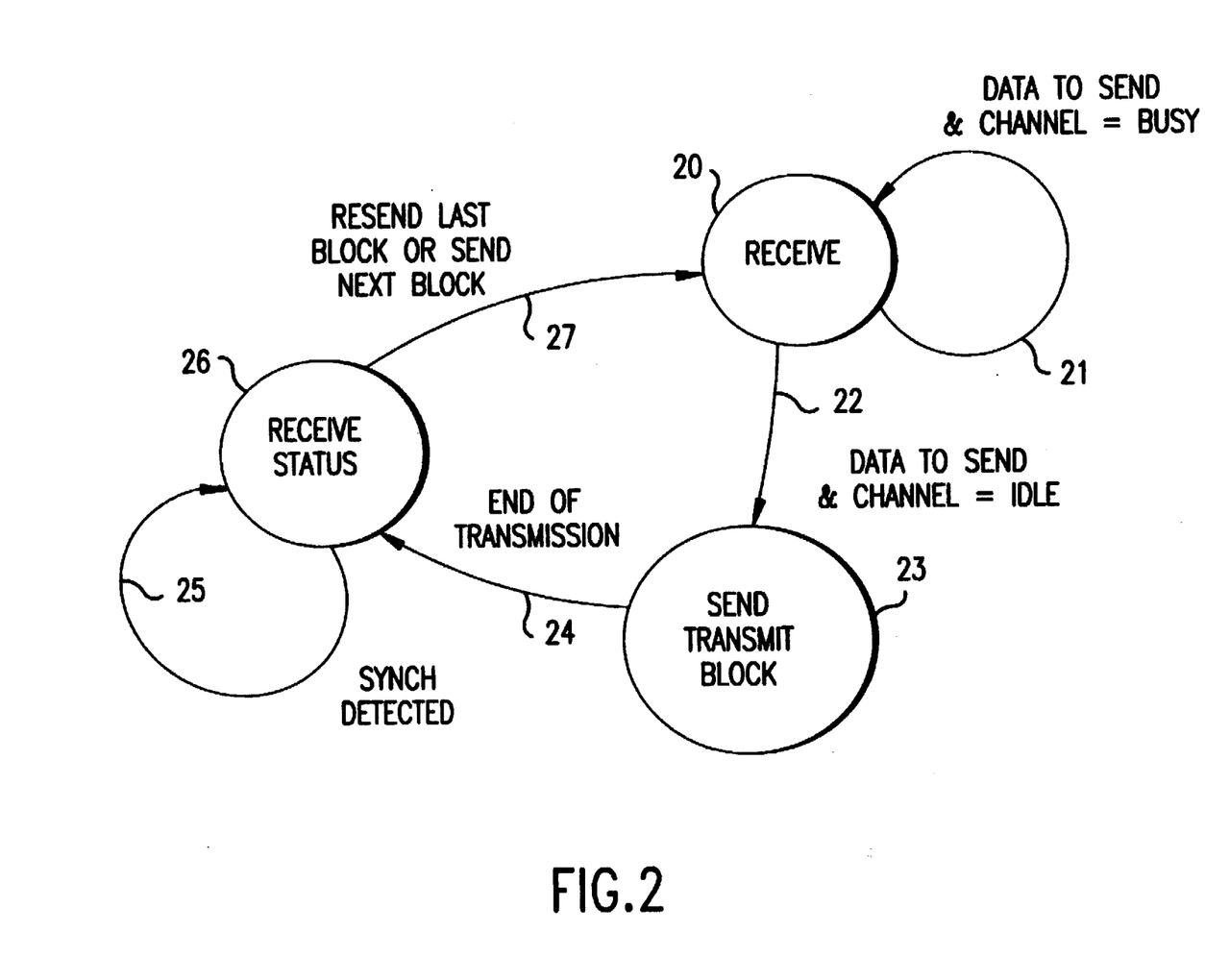
FIG. 2 shows an exemplary state diagram of the multiburst message procedure implemented by half-duplex SUs.

Specifically, only a single block of data is transmitted by the half-duplex SU per burst over the reverse channel. FIG. 2 shows an exemplary state diagram of the multi-burst message procedure implemented by half-duplex SUs. When an SU has data to send at state 20, the SU determines whether the channel is busy or idle. If the channel is busy at 21, the SU continues to monitor the channel until it is idle. When the channel is idle as shown at 22, the SU may send a transmit burst containing a single block of data at state 23. Once the transmit burst is completed at 24, the SU may switch to the receive mode at state 26 and wait until the preamble or synch bits of a base station transmission is detected at state 25. The base station can determine whether the block of data was successfully received, e.g., by use of a cyclical redundancy checksum (CRC) operation and this determination may be transmitted to the SU. If the block of data was successfully received then the next block of data in the queue is transmitted in the next transmit burst as shown at 27. If the block of data was not successfully received the SU resends the previous block of data in the next transmit burst as shown at 27. Since only one block of data may be transmitted per burst, the transmission of a multi-block message over a number of bursts may significantly lengthen the overall transmission.

Figure 3:
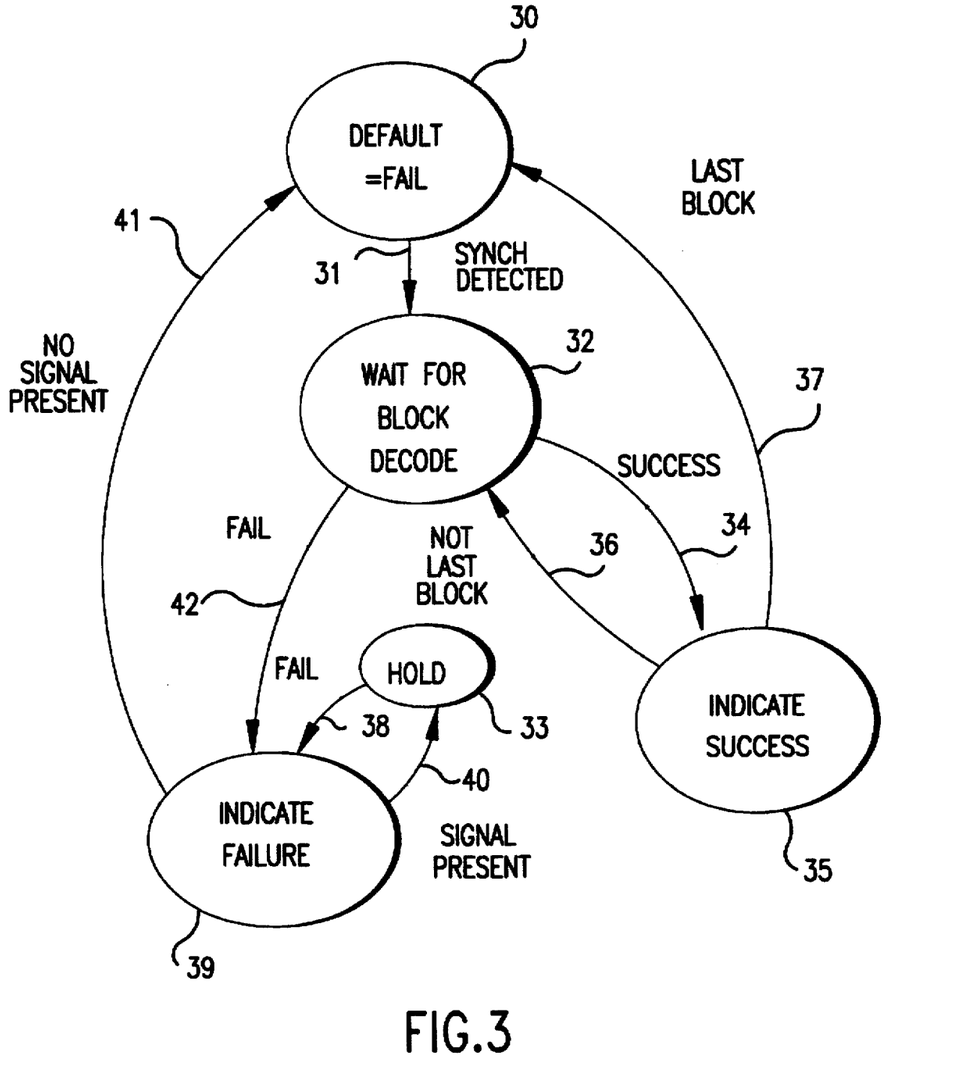
FIG. 3 shows an exemplary state diagram of a base station decode status procedure.

FIG. 3 shows an exemplary state diagram of a base station decode status procedure. The default status is set to "FAIL" at state 30. After the preamble or synch bits from an SU transmit burst are received at 31 and the entire block of data has been received, the base station determines whether the block of data has been successfully received. As indicated above, one way to determine whether or not the data has been successfully received is to perform a CRC operation in connection with the block of data received. However, it should be understood that many other techniques or other criteria can be used in determining whether or not the block of data has been successfully received.

Even though one or more SUs may provide only half-duplex operation, some may be full duplex. Accordingly, the base station decode status procedure diagrammed in FIG. 3 encompasses the possible transmission of multi-block bursts from full duplex SUs.

When the received block of data is successfully decoded as shown at 34, the base station transmits the status "SUCCESS" to the SU at 35. If more blocks of data are being received as in the case of a transmission from a full duplex SU, the block decode processing 32 and subsequent states are repeated as shown. However, if the block of data was the last or only block of data received from the SU, the base station returns to the default state 30.

Similarly, when the received block of data is not successfully decoded as shown at 42, the base station transmits the status "FAIL" to the SU at state 39. So long as a signal is still present as shown at 40, the base station remains in a hold status state 33 and repeatedly transmits a "FAIL" status 38 to the SU as may be the case with a multi-block transmission from a full duplex SU. When the signal is no longer present as shown at 41, the base station returns to the default state 30.

Thus in contrast to a full-duplex SU that may transmit up to M blocks per burst and simultaneously receive the decode status from the base station, the half-duplex SU must transmit L separate 1-block transmissions. If a particular message comprises L blocks of data, in theory an SU can transmit L blocks in one burst (so long as $L \geq M$) or L separate 1-block bursts. However, each transmit burst includes a significant number of overhead bytes associated with it. For example, in systems such as CDPD, overhead includes information pertaining to the Mobile Data Link Protocol (MDLP), e.g., TEI, N(s), N(r), etc., and information pertaining to Medium Access Control (MAC) processing, e.g., frame flag, color code, zero insertion, etc. The shorter the transmit burst the greater the ratio of overhead to actual data becomes. Therefore, when the SU is limited to single block bursts, the number of blocks required to transmit the message may be increased because of the additional overhead, further increasing communication delay, decreasing channel efficiency, and reducing the lifetime of the SU's battery. Moreover, when the SU is transmitting at lower code rates, e.g. ⅓, certain control frames cannot be formed into a single block of data and therefore cannot be transmitted at such rates.

Therefore, there is a need to improve the burst throughput and system throughput in wireless communications systems in which half duplex SUs are employed.

SUMMARY OF THE INVENTION

The present invention fulfills this need by providing a wireless communications system comprising a half-duplex subscriber unit for transmitting at least two successive blocks of data in a transmit burst, and a base station for receiving the transmit burst and for determining for each block of data, whether or not the block of data was successfully received and for transmitting an indication based on that determination associated with each block of data. The subscriber unit receives the indication associated with only the last of the successive blocks of data transmitted. If the last of the successive blocks of data transmitted was not successfully received, the subscriber unit according to the invention retransmits the transmit burst. The number of blocks of data transmitted in a single transmit burst is dependent upon the code rate to be used in connection with the transmit burst.

In a preferred embodiment, the number of blocks is selected based on the ratio of data bytes to total bytes transmitted for a given code rate. In a more preferred embodiment, the number of blocks per burst is selected by using a system throughput model and selecting the number of blocks per burst for each code rate that maximizes the system throughput. The number of blocks per burst in accordance with the invention is more than one and less than the maximum number of blocks that can be transmitted in one transmission window.

The present invention also provides a novel subscriber unit for use in a wireless communications system comprising a block processor for accepting an input of data frames and for forming a number of the data frames into a block of data, and a process manager interfaced with the block processing means for initiating the block processor to form at least one block of data. According to the invention, the process manager determines the number of blocks of data to be transmitted successively in a single transmit burst. That number of blocks is based upon the code rate at which the blocks of data are to be transmitted by the subscriber unit. The subscriber unit further comprises a burst formatter interfaced with the block processor to receive each block of data formed by the block processor for combining the number of blocks and for formatting the combined blocks to produce one transmit burst.

During communications the base station transmits a decode status to the subscriber unit. In a preferred embodiment, the subscriber unit further comprises a flag processor for receiving the decode status associated with the last block of data transmitted and for processing the same to provide a decode status output indicative of whether or not the last block of data in the transmit burst had been successfully received. According to this preferred embodiment of the invention, the process manager initiates the block processor to reform the same blocks of data if the last block of data as indicated by the decode status output had not been successfully received.

In a more preferred embodiment, the subscriber unit further comprises a channel quality processor for monitoring the signal from the base station and generates a channel quality indicator representative of the quality of the forward channel. The process manager may alter the number of blocks based on the channel quality indicator.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

While preferred embodiments of the invention will now be described in connection with either CDPD systems, it should be understood that the principles of the present invention are equally applicable to other protocols and conventions that are used in wireless communications.

According, to the invention, multiple blocks of data are transmitted by a half-duplex SU in each burst. The average number of bytes per block that are transmitted over the duration of the burst, i.e., the total data bytes transmitted divided by the total number of blocks transmitted, is defined herein as the burst throughput. The burst throughput is a measure of how much data per block is delivered in each transmit attempt. A measure of the average number of bytes per block delivered by the ensemble of SUs taking into account data errors, collisions, and retransmissions is defined herein as the system throughput.

The number of blocks to transmit per burst is selected based on the code rate being used over the established channel. Alternatively, the number of blocks per burst may also be based on a percentage of the maximum burst throughput at a given code rate or based on the maximum system throughput determined after modeling the system. In accordance with the invention, the half-duplex SU receives the base station decode status associated only with the last block of data transmitted in the burst.

Figure 4:
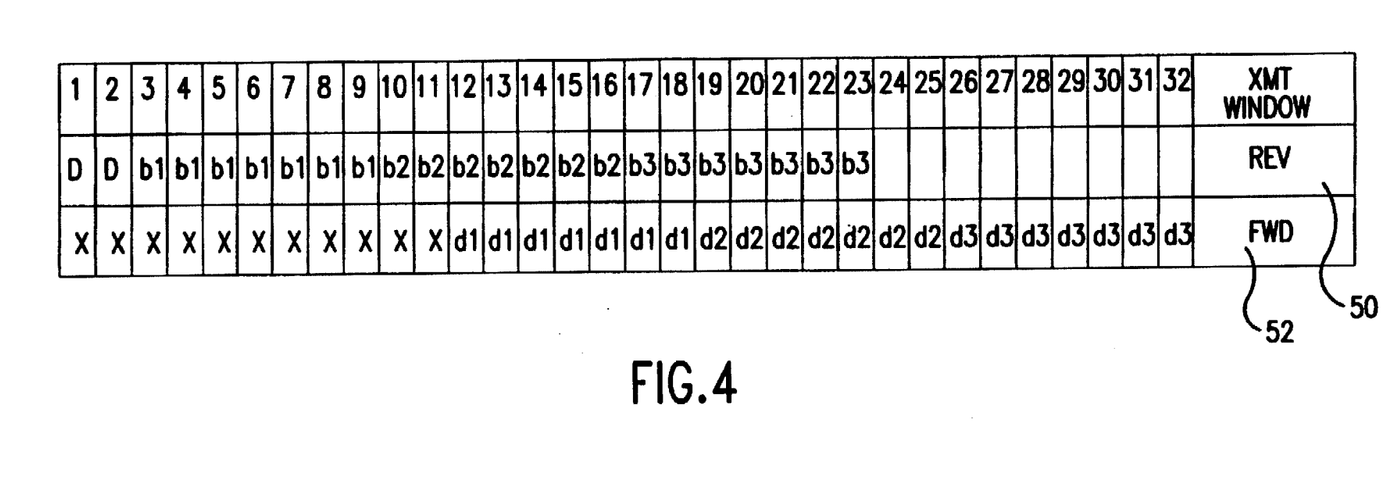
FIG. 4 shows the forward and reverse channels for a 3-block transmit burst.

For example, FIG. 4 shows a 3-block transmit burst in which the microslot boundaries of the transmission window are numbered 1–32. The reverse channel transmit burst 50 includes two microslots of preamble "D", and three consecutive blocks of data in which each block "bn" is transmitted over seven microslots. The forward channel transmission 52 represents the base station decode status "dn" associated with the last block data if it was successfully received or with the first block of data that was not successfully received in accordance with state diagram shown in FIG. 3 above. The base station decode status transmission will not be present at the SU's antenna because of the delay introduced by the base station hold and decode processing also described above in connection with FIG. 3. The set of dn values (in this example there are 7 per block), may be combined for example by majority decision (i.e., the greater of the number of FAILS or the number of SUCCESSES) to determine the decode status indication. This may be done to protect against errors in the forward channel data stream caused by noise, interference, etc.

As shown in FIG. 4, the decode status "dn" associated with the last block of data sent in the transmit burst is the only base station decode status that can be received by a half-duplex SU when multiple blocks are transmitted in the transmit burst. There is some degradation to the system when the first block or even the second block is not successfully received because the SU continues to transmit in the reverse channel (recall that so long as the base station is receiving a signal after an unsuccessful block reception, it will transmit a FAIL status). By optimizing the number of blocks per burst transmitted by the half-duplex SU, the burst throughput can be increased significantly over single-block bursts while simultaneously increasing the system throughput.

Figure 5:
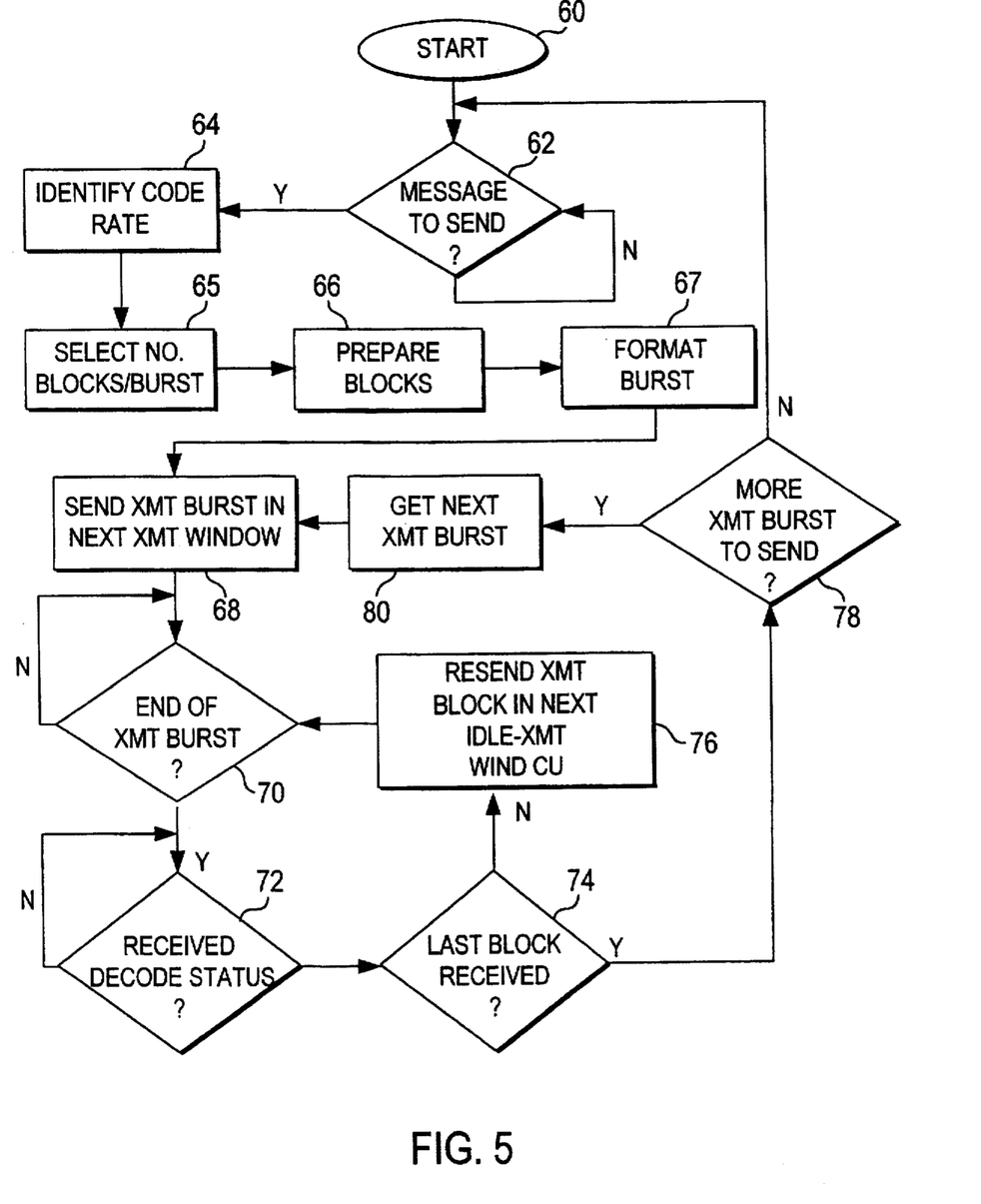
FIG. 5 is a functional flow diagram showing the operation of a half-duplex SU according to the present invention.

FIG. 5 is a functional flow diagram showing the operation of a half-duplex SU according to the present invention. During normal operation the SU operates according to its basic processing at 60, until it has a message to send as shown at 62. The SU's basic processing may include, for example, monitoring the forward channel to receive messages and to determine whether it is busy or idle. Once a message is available for transmission, the SU identifies the code rate at which the message will be sent, e.g., ⅓, ½, or ⅔, as shown at 64. The number of blocks of data to be transmitted per burst can then be determined at 65. As described above the number of blocks per burst can be selected based on the code rate to be used. Different code rates provide different ratios of the number of data bytes ($B_d$) to the total number of bytes including data and overhead ($B_t$) for a given number of blocks per burst. Given a particular code rate, the SU can select an optimal number of blocks per burst to be sent as a transmit burst as described below in detail.

Once the number of blocks per burst has been established and the code rate defined, the blocks of data can be prepared at 66 and the burst formatted at 67 with overhead bytes and blocks assembled to form at least one transmit burst. Since many messages will require multiple transmissions, a number of transmit bursts may be formatted and queued until they can be sent by the SU.

The SU monitors the channel until it is determined to be idle and sends the first transmit burst in the appropriate transmission window as shown at 68. After completing the transmission of the transmit burst at 70, the SU monitors the forward channel for the base station decode status at 72. Since the half-duplex SU cannot receive the base station decode status until the SU has completed its transmission, the SU will only receive the decode status associated with the last block of the transmit burst as shown in FIG. 4. If the decode status received from the base station as determined at 74 indicates that the last block was successfully received, the SU checks for more transmit bursts to send at 78. If there are more transmit bursts to send, the next transmit burst in the queue is fetched at 80 and transmitted by repeating the steps just described. If there are no additional transmit bursts to send, then the SU returns to its basic operating state at 60.

When the decode status associated with the last block of data of the transmit burst was not successfully received by the base station, as determined by the SU at 74, the transmit burst is resent at 76 until it is successfully received as determined at 74. When the SU receives the decode status= FAIL, it cannot determine which block of the multi-block transmit burst was not successfully received as discussed above. Therefore, the entire transmit burst is preferably resent.

While the data throughput ratio ($B_d/B_t$) increases by transmitting more blocks per burst since the percentage of overhead bytes decreases as the burst becomes longer, there should be a limit placed on the number of blocks per transmission. Since the channel is busy so long as an SU is transmitting, it is undesirable to continue to transmit thereby occupying the channel when the base station has not received the previously transmitted blocks successfully. Therefore, there is a tradeoff between increasing the number of blocks and unnecessarily occupying the channel which effectively prevents transmissions by other SUs.

In a preferred embodiment, the optimal burst length, i.e. the number of blocks per burst, is determined statistically. For example, if it can be estimated, a priori, how many SUs will communicate with a base station at each of a number of predetermined code rates, then the overall system performance may be appraised by determining (i) the probability of collision, (ii) the block error rate due to noise, interference, etc. and (iii) the amount of user data transmitted in burst. Once these values are determined for a given set of burst lengths for each code rate, then the system throughput can be determined by multiplying the amount of data transmitted in each block per code rate by the probability that no collision occurs, and the probability that none of the blocks in the previous burst is in error and by the percentage of SUs at that code rate. The sum of the channel efficiency for each code rate may then be determined and yields the system throughput.

For example, in a system in which SUs may operate at any of the following code rates, ⅔, ½, and ⅓, the system throughput (ST) would be derived as follows:

$$ST = \frac{D_{2/3}}{L_{2/3}} (1-P_c)(1-P_{2/3})^{L_{2/3}} \frac{N_{2/3}}{N} + \quad (1)$$

$$\frac{D_{1/2}}{L_{1/2}} (1-P_c)(1-P_{1/2})^{L_{1/2}} \frac{N_{1/2}}{N} +$$

$$\frac{D_{1/3}}{L_{1/3}} (1-P_c)(1-P_{1/3})^{L_{1/3}} \frac{N_{1/3}}{N}$$

where $N_{2/3}$, $N_{1/2}$, and $N_{1/3}$ are the numbers of users at ⅔, ½, and ⅓ code rates, respectively; $D_{2/3}$, $D_{1/2}$, and $D_{1/3}$ are the total data per burst at code rates of ⅔, ½, and ⅓, respectively; $L_{2/3}$, $L_{1/2}$, and $L_{1/3}$ are the burst lengths in number of blocks of data for code rates ⅔, ½, and ⅓, respectively; N is the total number of SUs in the system; $P_c$ is the probability of collision; and $P_{2/3}$, $P_{1/2}$, and $P_{1/3}$ is the probability of a block error at code rates ⅔, ½, and ⅓, respectively. For different code rates ($CR_i$), equation (1) above may be simplified as follows:

$$ST = \sum_i \frac{D_{CR_i}}{L_{CR_i}} (1-P_c)(1-P_{CR_i})^{L_{CR_i}} \frac{N_{CR_i}}{N} \quad (2)$$

The system throughput is a measure of how much data is transferred per block across the ensemble of SUs. Thus all possible choices of burst lengths ($L_{CR_i}$), up to M blocks per burst (the maximum number of blocks typically defined by system specification that are transmitted per burst), for each code rate, may be used in deriving the system throughput. The choices of $L_{CR_i}$ for each code rate that result in the maximum system throughput are then preferably used by the half duplex SUs.

The number of blocks per burst to be used in connection with each code rate may also be selected based on a predetermined percentage of the maximum ratio ($Chan_{max}$) of data bytes ($B_d$) to total bytes ($B_t$) where the total bytes is the sum of data bytes plus overhead bytes for that code rate. For example, in a CDPD system, the zero stuffing feature of the HDLC framing protocol may require up to one bit out of six, i.e., at least ⅙ of all bits in the transmission may be allocated to overhead. Thus a CPDP full duplex SU, one that will transmit M blocks per burst assuming the blocks are being successfully received by the base station, has a Chan$_{max}$ that is approximately 5/6 or 0.833. Thus a half duplex SU must transmit M blocks per burst to provide the same performance in terms of burst throughput as a full-duplex SU. But the tradeoff as discussed above is the decrease in system throughput when half-duplex SUs transmit too many blocks per burst. Therefore, to avoid the complicated modeling that is discussed above, it may be preferable to select a predetermined percentage (P$_{chan}$) of Chan$_{max}$ to select the burst length to be used in connection with a given code rate. It should be understood that different systems and even different code rate may lead to a different value of Chan$_{max}$. While, Chan$_{max}$=0.833 is used here to illustrate this feature of the invention, it is not intended that the invention be limited thereto. Thus if P$_{chan}$ is 85%, for example, the values for L$_{2/3}$, L$_{1/2}$, and L$_{1/3}$ can be selected by generating the data shown in Table 1 below.

TABLE 1

| Rate | Blocks | Total Bytes (B$_t$) | MDLP Overhead Bytes | MAC Overhead Bytes | Actual Data Throughput Bytes (B$_d$) | Ratio of data to total bytes | P$_{Chan}$ |
|------|--------|---------------------|---------------------|--------------------|--------------------------------------|------------------------------|------------|
| 2/3  | 1      | 28                  | 6                   | 2-6                | 16                                   | 0.57                         | 68         |
| 2/3  | 2      | 57                  | 6                   | 2-10               | 40                                   | 0.70                         | 83         |
| 2/3  | 3      | 85                  | 6                   | 2-15               | 64                                   | 0.75                         | 90         |
| 1/2  | 1      | 20                  | 6                   | 2-5                | 9                                    | 0.45                         | 54         |
| 1/2  | 2      | 40                  | 6                   | 2-8                | 26                                   | 0.65                         | 77         |
| 1/2  | 3      | 60                  | 6                   | 2-11               | 43                                   | 0.72                         | 86         |
| 1/3  | 1      | 12                  | 6                   | 2-4                | 2                                    | 0.17                         | 20         |
| 1/3  | 2      | 24                  | 6                   | 2-5                | 12                                   | 0.50                         | 60         |
| 1/3  | 3      | 36                  | 6                   | 2-7                | 22                                   | 0.61                         | 73         |
| 1/3  | 4      | 47                  | 6                   | 2-9                | 32                                   | 0.68                         | 82         |
| 1/3  | 5      | 59                  | 6                   | 2-11               | 42                                   | 0.71                         | 85         |

The actual data throughput may be described as the minimum subnetwork dependent convergence protocol (SNDCP) data which includes a 1-byte header. The MDLP and MAC overhead have been described above. In the example set forth in Table 1, the MAC overhead includes 4 bytes of CRC. As is evident from Table 1, single-block bursts at lower coding rates are not useful because of the limited number of actual data transmitted by the burst.

As a further example, consider a 200-byte message. A full-duplex SU operating at a data rate of 1/3 would transmit 21 blocks in a single burst. This value is arrived at by extrapolating table for rate 1/3 to 200 bytes in the "Actual Data Throughput Bytes" column. For example, the first block conveys two bytes and each additional block conveys ten bytes. Thus 200 bytes of data require 1 block for the first 2 bytes and then 20 blocks of 10 bytes each for the remaining 198 bytes for a total of 21 blocks.

A half-duplex SU operating at the same data rate, would require 100 single- block bursts (2 bytes per burst from Table 1) to transmit the same information. Thus, according to the present invention, a half-duplex SU would transmit multiple blocks to increase the ratio of data bytes to total bytes.

As shown in Table 1, if a half-duplex SU transmits the same 200-byte message using 5 blocks per burst it will reduce the number of transmissions from 100 bursts to only 5 bursts where each of the 5 bursts sends 5 blocks of data or 42 bytes of data. Similarly, the total number of blocks to be transmitted is reduced from 100 blocks to 25 blocks in this example.

Moreover, if P$_{chan}$ is at least 85%, it can be seen from Table 1, that L$_{2/3}$=3, L$_{1/2}$=3, and L$_{1/3}$=5. It should be understood that each code rate may have a different burst length and the burst length may vary depending upon the P$_{chan}$ that is selected. It should be further understood that these code rates and the value of P$_{chan}$ have been described herein for exemplary purposes only and that the invention is not intended to be limited thereto.

Figure 6:
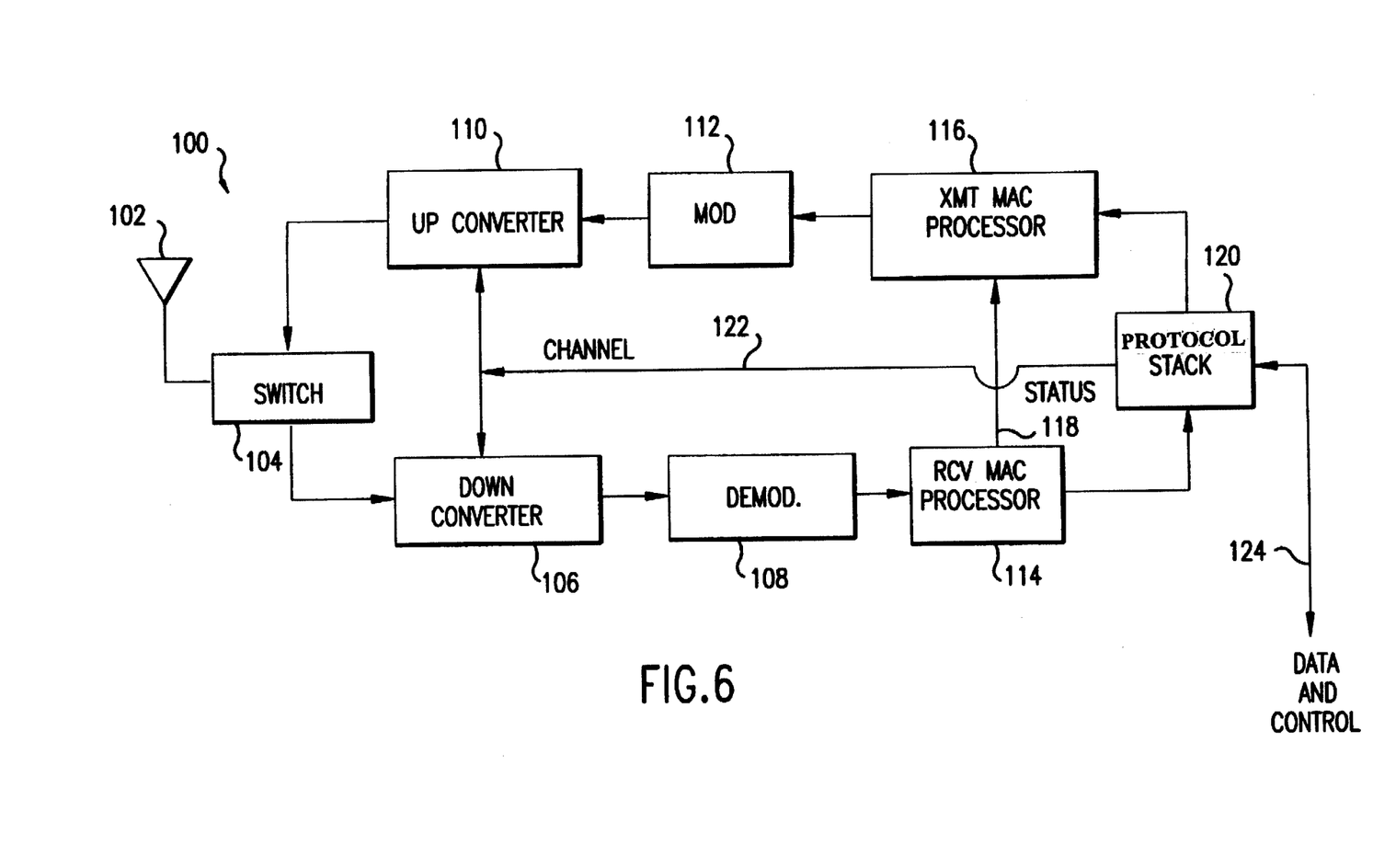
FIG. 6 is a block diagram of a half-duplex SU according to the present invention.

FIG. 6 is a block diagram of a half-duplex SU 100 according to the present invention. An antenna/transmitter 102 is shown for receiving transmissions over the forward channel and for transmitting bursts over the reverse channel. The antenna switch 104 switches the antenna/transmitter between its receive and transmit modes. When the SU is in the receive mode, RF energy picked up at the antenna is downconverted to a baseband signal by downconverter 106 and then subsequently demodulated by demodulator 108 to recover the digital information that was transmitted. Similarly, digital information to be transmitted is modulated by modulator 112 and upconverted from baseband to RF by upconverter 110. The upconverted signal is then transmitted from the transmitter.

Data or control information to be transmitted is provided by other SU processing subsystems (not shown). The data or control information is input to the protocol stack 120 for formatting into frames according to MDLP. The formatted data, referred to hereinafter as MDLP data, is transportable through the communications system. The protocol stack also provides channel information 122 such as channel number, transmit frequency and receive frequency to the upconverter and downconverter. The transmit MAC processor 116, receives the MDLP data from the protocol stack and preforms block and burst processing which will be described in detail below. Similarly, the receive MAC processor 114, processes the received blocks of data and overhead to recover MDLP data that is then passed to the protocol stack. The protocol stack further processes the MDLP data and provides an output of data or control information to appropriate SU processing subsystems.

As discussed above, the base station will transmit the decode status associated with the blocks of data received from the SU. The receive MAC processor decodes this status from the base station and provides the status as an output 118 to the transmit MAC processor. Based on this status output 118, the transmit MAC processor resends the last transmit burst or sends the next transmit burst.

Figure 7:
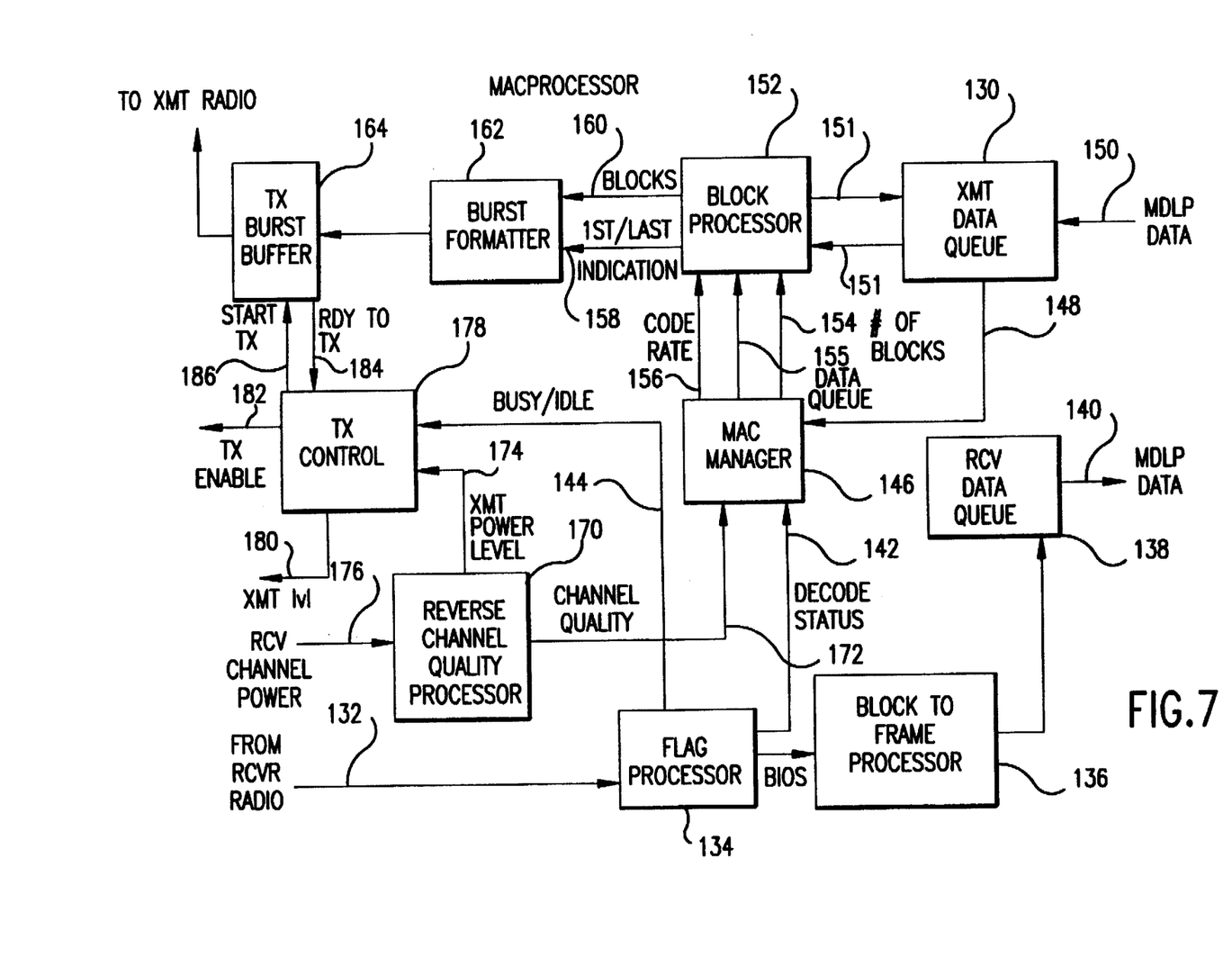
FIG. 7 is a detailed block diagram of the MAC processing according to a preferred embodiment of the invention.

FIG. 7 is a detailed block diagram of the MAC processing according to a preferred embodiment of the invention. Both transmit and receive processing have been depicted in a single MAC processor 130 in FIG. 7. However, it should be understood that the transmit and receive MAC processing may be functionally separated as shown in FIG. 6.

Demodulated data from the receiver radio 132 is received in the MAC processor 130 by the flag processor 134. The flag processor removes the decode status and any other flags detected in the forward channel and processes these flags to determine one that decodes status 142 and the channel status 144. The received data is then output to the block-to-frame processor 136, which based on the code rate used in transmissions from the base station to the subscriber unit, recovers the data frames that were transmitted. The data frames are then output from the block-to-frame processor to the received data queue 138. The queued data frames are output as MDLP data 140 to the protocol stack.

The received channel power is also monitored by the channel quality processor 170. The channel quality processor processes the received channel power to derive various statistical properties of the forward channel and provide an output 172 indicative of the channel quality. The MAC processor also receives this input. In a preferred embodiment, the MAC manager 146 uses the channel quality indicator 172 to determine a code rate to be used in the next transmission. Means for dynamically altering the SU's operational code rate is described in provisional patent application serial no. 60/004,801, entitled "EXTENDED CHANNEL ACCESS FOR HALF-DUPLEX TRANSMITTERS," filed on Sep. 22, 1995 and incorporated herein by reference. It should also be understood that based on the system throughput modeling method described above, the MAC manager may use the signal quality indicator to dynamically redefine $P_{CRi}$. Accordingly, if the signal quality is poor, the burst lengths $L_{CRi}$, that maximize ST may be shorter; and if the signal quality is good, the burst lengths that maximize ST may be longer. As will be described in more detail below, the decode status is also used by the MAC manager to determine which data frames are to be transmitted in the next transmit burst.

MDLP data 150 is input to the transmit data queue 148. The block processor 152 receives data frames from the transmit data queue based on inputs 155 from the MAC manager. The MAC manager also provides an output 156 indicative of the code rate to be used in the next transmission to the block processor as well as a second output 154 indicative of the number of blocks per transmit burst to be used. Both of these outputs are received by the block processor as shown in FIG. 7.

The block processor forms the data frames, based on the code rate, into an appropriate block of data by performing redundancy coding, e.g. forward error correction (FEC) coding consistent with the code rate as is understood by those of ordinary skill in the art. Based on the number of blocks to be transmitted in the next transmit burst, the block processor also formats the block of data with the appropriate overhead bytes. Each block of data is output from the block processor over interface 160 to the burst formatter 162. The block processor also provides an output 158 indicative of the first block to be included in a transmit burst and the last block to be included in the transmit burst. The burst formatter 162 combines the blocks of data from the first block to the last block and provides the appropriate overhead for the burst. Each transmit burst that is formatted by the burst formatter is output to a transmit burst buffer 164.

The channel quality processor 170 also generates a transmit power output 174 in a preferred embodiment based on the quality of the forward channel. The transmit power output is indicative of the power that should be used in the following transmission of the subscriber unit. The output 174 is received by the transmit controller 178. The transmit controller 178 additionally receives the channel status output 144 from the flag processor. Based on these inputs, the transmit controller evaluates when there is a transmission ready to send as indicated by the output 184 from the transmit buffer. When the channel is idle as indicated by the channel status, the transmit controller initiates the start transmission by output 186 to the transmit burst buffer. In addition, the transmit controller provides a transmit enable output 182 to the modulator. Also in a preferred embodiment, a transmit power level is provided by the transmit controller and is received by a power circuit of the subscriber unit so that the power can be adjusted accordingly.

As mentioned above, the decode status 142 is used by the MAC manager to select the appropriate data frames to be transmitted during the next transmit burst. When the decode status is a SUCCESS, the MAC manager simply indicates via output 155 to the block processor to read the next frames in the queue 148. However, if the decode status is a FAIL, the MAC manager output 155 will indicate to the block processor to reprocess the last data frames sent with the most previous bursts. It should be understood that since the transmit bursts are buffered in the TX burst buffer, an interface may be provided between the MAC manager and the TX burst buffer to permit the MAC manager to directly select either the next transmit burst or the last transmit burst thereby avoiding the need to reform each block and reformat the burst when the last burst was not successfully received.

While the invention has been described and illustrated with reference to specific embodiments, those skilled in the art will recognize that modifications and variations may be made without departing from the principles of the invention as described hereinabove and set forth in the following claims.

What is claimed:

1. A wireless communications system, comprising:
   a half-duplex subscriber unit for transmitting at least two successive blocks of data in a transmit burst; and
   a base station for receiving the transmit burst and for determining for each block of data, whether or not the block of data was successfully received and for transmitting an indication based on said determining for each block of data,
   the subscriber unit receiving the indication associated with the last of the successive blocks of data transmitted and retransmitting the transmit burst if the last of the succesive blocks of data transmitted was not successfully received.

2. The communications system of claim 1, wherein the communications system comprises a number N of half-duplex subscriber units and wherein the system efficiency (SE) is determined in accordance with the following equation:

$$ST = \sum_i \frac{D_{CR_i}}{L_{CR_i}} (1 - P_c)(1 - P_{CR_i})^{L_{CR_i}} \frac{N_{CR_i}}{N}$$

where $CR_i$ is one of i code rates employed by the N subscriber units, $N_{CRi}$ is the number of subscriber units employing each code rate $CR_i$; $D_{CRi}$ is the total data per block at each code rate $CR_i$; $L_{CRi}$ is the burst length in number of blocks of data for each code rate $CR_i$; $P_c$ is the probability of collision; and $P_{CRi}$ is the probability of a block error at each code rate $CR_i$;

the number of blocks of data to be transmitted in a single transmit burst being determined by selecting values of $L_{CRi}$ that maximize the system efficiency (SE).

3. The communications system of claim 1, wherein the transmit burst is shorter than a maximum transmission window of the communications system.

4. The communications system of claim 1, wherein the number of blocks of data transmitted in a single transmit burst is dependent upon a code rate to be used in connection with said single transmit burst.

5. The communications system of claim 4, wherein a maximum ratio ($CHAN_{max}$) of data bytes to total bytes that can be transmitted by a full-duplex subscriber unit in one transmit burst is predefined and each block of data at said code rate comprises a number of data bytes and a number of overhead bytes, the number of blocks of data transmitted being based on a predetermined percentage ($P_{chan}$) of a ratio of data bytes to total bytes ($B_d/B_t$) relative to the maximum ratio.

6. The communications system of claim 5, wherein the predetermined percentage is at least about 85 percent.

7. A method of extending channel access for half-duplex transmitters in a wireless communications system, comprising the steps of:

transmitting at least two successive blocks of data in a single transmit burst;

upon completion of said transmit burst, receiving a transmission from a base station indicating whether or not the last of the successive blocks of data was successfully received by the base station; and retransmitting said transmit burst if the last of the successive blocks of data was not successfully received.

8. The method of claim 7, wherein the communications system comprises a number N of half-duplex subscriber units, the method further comprising the steps of:

determining the system throughput (ST) in accordance with the following equation:

$$ST = \sum_i \frac{D_{CR_i}}{L_{CR_i}} (1 - P_c)(1 - P_{CR_i})^{L_{CR_i}} \frac{N_{CR_i}}{N}$$

where $CR_i$ is one of i code rates employed by the N subscriber units, $N_{CR_i}$ is the number of subscriber units employing each code rate $CR_i$; $D_{CR_i}$ is the total data per block at each code rate $CR_i$; $L_{CR_i}$ is the burst length in number of blocks of data for each code rate $CR_i$; $P_c$ is the probability of collision; and $P_{CR_i}$ is the probability of a block error at each code rate $CR_i$; and selecting the number of blocks of data to be transmitted in a single transmit burst by selecting values of $L_{CR_i}$ that maximize the system throughput (ST).

9. The method of claim 7, wherein a message is transmitted in a plurality of successive transmit bursts, the method further comprising the steps of:

transmitting a next successive transmit burst if the last of the successive blocks of data transmitted in the most previous transmit block was successfully received by the base station.

10. The method of claim 7, further comprising the step of:

selecting based upon a code rate to be used, the number of blocks to be transmitted in said transmit burst.

11. The method of claim 10, wherein each block of data at said code rate comprises a number of data bytes and a number of overhead bytes, the method further comprising the step of:

selecting the number of blocks of data to be transmitted in said transmit burst based upon a ratio of data bytes to total bytes at said code rate.

12. The method of claim 7, wherein a maximum ratio ($CHAN_{max}$) of data bytes to total bytes that can be transmitted by a full-duplex subscriber unit is predefined and each block of data at the known code rate comprises a number of data bytes and a number of overhead bytes, the method further comprising the step of:

selecting the number of blocks of data based on a predetermined percentage ($P_{chan}$) of a ratio of data bytes to total bytes ($B_d/B_t$) relative to the maximum ratio.

13. The method of claim 12, wherein the predetermined percentage is at least about 85 percent.

14. A subscriber unit for use in a wireless communications system comprising:

a block processing means for accepting an input of data frames and for forming a number of the data frames into a block of data; and a management means interfaced with said block processing means for initiating said block processing means to format least one block of data, said management means determining a number of blocks of data to be transmitted successively in a single transmit burst, said number of blocks being based upon a code rate at which the blocks of data are to be transmitted by the subscriber unit.

15. The subscriber unit of claim 14, further comprising:

a burst formatting means interfaced with said block processing means to receive each block of data formed by said block processing means for combining said number of blocks and for formatting the combined blocks to produce one transmit burst.

16. The subscriber unit of claim 14, wherein each block of data comprises at least one data frame that is coded based on a code rate, said block processing means formatting each block of data based on both the code rate and said number of blocks.

17. The subscriber unit of claim 14, wherein during communications a base station of the wireless communications system transmits a decode status to said subscriber unit, said decode status being indicative of whether or not a previous block of data transmitted from said subscriber unit had been successfully received by the base station, the subscriber unit further comprising:

a flag processing means for receiving the decode status associated with the last block of data transmitted and for processing the same to provide a decode status output indicative of whether or not the last block of data in the transmit burst had been successfully received; and said management means initiating the block processing means to reform the same blocks of data if the last block of data as indicated by the decode status output had not been successfully received.

18. The subscriber unit of claim 14, wherein said number of data frames is based on both the code rate and said number of blocks.

19. The subscriber unit of claim 14, wherein the subscriber unit is capable of receiving a signal transmitted from a base station over a forward channel of the wireless communications system, further comprising:

a channel quality processor for monitoring the signal and for generating a channel quality indicator representative of the quality of the forward channel;

said management means altering said number of blocks based on the channel quality indicator.

* * * * *